(12) United States Patent
Kitazato

(10) Patent No.: US 10,542,074 B2
(45) Date of Patent: Jan. 21, 2020

(54) STREAM TRANSMISSION USING MPEG MEDIA TRANSPORT (MMT)

(71) Applicant: SATURN LICENSING LLC, New York, NY (US)

(72) Inventor: Naohisa Kitazato, Tokyo (JP)

(73) Assignee: SATURN LICENSING LLC, New York, NY (US)

(*) Notice: Subject to any disclaimer, the term of this patent is extended or adjusted under 35 U.S.C. 154(b) by 446 days.

(21) Appl. No.: 14/903,104

(22) PCT Filed: Jul. 11, 2014

(86) PCT No.: PCT/JP2014/068644
§ 371 (c)(1),
(2) Date: Jan. 6, 2016

(87) PCT Pub. No.: WO2015/022827
PCT Pub. Date: Feb. 19, 2015

(65) Prior Publication Data
US 2016/0149994 A1    May 26, 2016

(30) Foreign Application Priority Data
Aug. 12, 2013  (JP) .................. 2013-167605

(51) Int. Cl.
G06F 15/16 (2006.01)
H04L 29/08 (2006.01)
(Continued)

(52) U.S. Cl.
CPC .............. H04L 67/06 (2013.01); H04J 3/00 (2013.01); H04L 65/4076 (2013.01);
(Continued)

(58) Field of Classification Search
None
See application file for complete search history.

(56) References Cited

U.S. PATENT DOCUMENTS 6,618,751 B1* 9/2003 Challenger ........... H04L 67/325
709/203
2004/0170162 A1* 9/2004 Hung ............... H04N 21/23608
370/389
(Continued)

FOREIGN PATENT DOCUMENTS

CN    1832439 A    9/2006
CN  101895364 A   11/2010
(Continued)

OTHER PUBLICATIONS

Extended European Search Report dated May 31, 2017 in Patent Application No. 14836904.4.
(Continued)

Primary Examiner — Padma Mundur
(74) Attorney, Agent, or Firm — Oblon, McClelland, Maier & Neustadt, L.L.P.

(57) ABSTRACT

A transmission stream is generated. In the transmission stream, a first transmission packet where transmission media is included in a payload and a second transmission packet where information relating to the transmission media is included in the payload are time division multiplexed. The transmission stream is transmitted to a receiving side through a predetermined transmission path. If the transmission media included in the payload of the first transmission packet is file data configuring the predetermined contents, information relating to the predetermined contents is inserted into a header thereof. At the receiving side, the first transmission packet including the file data configuring the predetermined contents can be acquired easily and accurately based on the information.

14 Claims, 14 Drawing Sheets

(51) Int. Cl.
*H04N 21/236* (2011.01)
*H04J 3/00* (2006.01)
*H04L 29/06* (2006.01)
*H04N 21/235* (2011.01)
*H04N 21/643* (2011.01)

(52) U.S. Cl.
CPC ............ *H04L 65/601* (2013.01); *H04L 69/22* (2013.01); *H04N 21/2353* (2013.01); *H04N 21/23605* (2013.01); *H04N 21/23614* (2013.01); *H04N 21/64322* (2013.01)

(56) References Cited

U.S. PATENT DOCUMENTS

| | | | |
|---|---|---|---|
| 2004/0181666 A1* | 9/2004 | Candelore | H04N 7/162 713/160 |
| 2009/1316695 | 12/2009 | Li et al. | |
| 2010/0269147 A1* | 10/2010 | Zetterower | H04N 5/782 725/114 |
| 2013/0094563 A1* | 4/2013 | Bae | H04N 21/236 375/240.01 |
| 2014/0204271 A1 | 7/2014 | Kim et al. | |
| 2014/0317674 A1* | 10/2014 | Hwang | H04N 21/631 725/118 |
| 2015/0350719 A1 | 12/2015 | Kim et al. | |

FOREIGN PATENT DOCUMENTS

WO    WO 2012/173441 A2    12/2012
WO    WO 2012/173441 A3    12/2012

OTHER PUBLICATIONS

Imed Bouazizi et al., "Restructuring of MMTP Protocol-Proposed Changes to MMTP and Payload Format", 105. MPEG Meeting, Motion Picture Expert Group or ISO/IEC JTC1/SC29/WG11, MPEG2013/m29432, No. m30555, XP030059082, Aug. 1, 2013, 18 pages.

Kyungmo Park et al, "Study of ISO/IEC CD 23008-1 MGEP Media Transport", International Organization for Standardization, Coding of Moving Pictures and Audio, Oct. 2012, pp. 125, ISO/IEC JTC1/SC29/WG11, Shanghai, China.

Text of ISO/IEC 2nd CD 23008-1 MPEG Media Transport, International Organization for Standardization,Coding of Moving Pictures and Audio, Jan. 2013, pp. 4, ISO/IEC JTC1/SC29/WG11, Geneva, Switzerland.

ARIB Standard, "Content Download System for Digital Broadcasting", ARIB STD-B45, Dec. 6, 2011, pp. 38 Including 20 Pages of English Translation.

Kyungmo Park, Youngkwon Lim, Shuichi Aoki, Gerard Fernando, Jin Young Lee, "Study of ISO/IEC CD 23008-1 MPEG Media Transport", Oct. 2012, Shanghai, China.

Notification of the First Office Action issued in corresponding Chinese Application No. 201480044501.8 dated Jun. 1, 2018, 38 pages.

* cited by examiner

Description about each parameter of PA Message

| Item | Item in general terms | Description |
|---|---|---|
| message_id | Message ID | Fixed value of identifying PA message in a variety of signaling information |
| version | Version | Version of PA Message is shown. 8 bits integer value. If any part of parameters configuring MPT is updated, value is incremented by +1. |
| length | Table length | Byte count of PA Message. PA Message is counted immediately after field. |

FIG. 6

Description about each parameter of PA Message

| Item | Item in general terms | Description |
|---|---|---|
| table_id | Table ID | Fixed value of identifying MP table in a variety of signaling information |
| version | Version | Version of MPT is shown. 8 bits integer value. If any part of parameters configuring MPT is updated, value is incremented by +1. |
| length | Table length | Byte count of MP table. MP table is counted immediately after field. |
| Package_id | Package ID | Identification information including all signals and files transmitted by broadcasting signal as whole package. |
| MPT_descriptors | MPT descriptor | Storage area of descriptors over whole package. Assumption that one or plural descriptors are disposed by specifying descriptors for a variety of purposes. |
| Number_of_assets | Asset number | Number of signals (assets) configuring package. For the number, the following asset loops are disposed. |
| Asset_id | Asset ID | ID of uniquely identifying asset. |
| gen_loc_info | General location information | Location of acquiring asset is shown. |
| Asset_descriptors | Asset descriptor area | Storage area of descriptors relating to asset. Assumption that one or plural descriptors are disposed by specifying descriptors for a variety of purposes. |

FIG.7

File content descriptor configuration

| Data structure | bit | Identifier |
|---|---|---|
| file_content_descriptor(){ | | |
|   descriptor_tag | 16 | uimsbf |
|   descriptor_length | 16 | uimsbf |
|   content_id | 24 | uimsbf |
|   content_version | 8 | uimsbf |
|   content_type | 8 | bslbf |
|   number_of_Base_URI_byte | 8 | uimsbf |
|   for (j=0;j<number_of_Base_URI_byte;j++){ | | |
|     Base_URI_byte | 8 | bslbf |
|   } | | |
|   number_of_files | 16 | uimsbf |
|   for(i=0;i<number_of_files;i++){ | | |
|     item_ID | 8 | uimsbf |
|     item_version | 16 | uimsbf |
|     media_type | 32 | bslbf |
|     item_size | 8 | uimsbf |
|     number_of_URI_bytes | | uimsbf |
|     for (j=0;j<number_of_URI_bytes;j++){ | | |
|       item_URI_byte | 8 | bslbf |
|     } | | |
|   } | | |
|   expire_date | 40 | bslbf |
|   estimated_update_time | 40 | bslbf |
| } | | |

FIG.8

| Item | Item in general terms | Description |
|---|---|---|
| content_id | Content ID | ID of identifying content that is specific use unit as whole file group transmitted. 24 bits integer value. |
| content_version | Content version | Version of content having a specific content ID is shown. 8 bits integer value. If any part of parameters configuring content is updated, value is incremented by +1. |
| content_type | Content type | Type of content is shown. |
| base_URI_byte | Base URI | Reference URI common to each file configuring content. Communication acquisition destination is shown if not acquired by broadcasting. |
| item_ID | Item ID | ID for identifying file. Value is same as that added to MFU header. |
| item_version | Item version | Version of file is shown. If content is updated, value is incremented by +1. |
| media_type | Media type | Media classification and encoding system of file data are shown. |
| item_size | Item size | Data size of file. Shown by number of bytes. |
| item_URI_byte | Item URI | URI per file is shown. If Base_URI is designated, URI of file is provided by character string connected to Base_URI. |
| expire_date | Expire date | Expire date of content is shown. Holding file after expiration date is inhibited. |
| estimated_update_time | Estimated update time | Estimated time when content is changed, or content is updated next. |

FIG.9

File transmission parameters of MMT extension header

| Item | Item in general terms | Description |
|---|---|---|
| content_id | Content ID | ID of identifying content that is specific use unit as whole file group transmitted. 32 bits integer value. |
| content_version | Content version | Version of content having a specific content ID is shown. 16 bits integer value. If any part of parameters configuring content is updated, value is incremented by +1. |
| Part_id | Part ID | ID for identifying each part divided, if whole contents are divided into each packet. |
| Number_of_parts | Part number | Number of parts divided, if whole contents are divided into each packet. |

FIG. 11

STREAM TRANSMISSION USING MPEG MEDIA TRANSPORT (MMT)

TECHNICAL FIELD

The present technology relates to a transmitting apparatus, a transmitting method, a receiving apparatus and a receiving method. More particularly, the present technology relates to a transmitting apparatus or the like that transmits file contents.

BACKGROUND ART

In the related art, digital broadcasting has been specified and operated worldwide based on a system specification of a MPEG2-TS system. While 10 to 15 years elapsed after the operation was started, a technology of video image encoding progresses. Along therewith, high-resolution and high image quality requirements become increased. On the other hand, as the internet has been widely used and speed-up, a video image signal having an image quality equivalent to broadcasting can be received via a communication path.

Under the circumstances, services integrally utilizing broadcasting and communication are increasingly expected, and standardization and integration of a delivery specification of broadcasting and communication are required in a technical point of view. As a result, a transmission method of a broadcasting system specification by an IP system similar to the communication is studied as a new broadcasting method instead of the MPEG2-TS system in the related art (see Non-Patent Document 1, for example).

Non-Patent Document 1: Study of ISO/IEC CD 23008-1 MPEG Media Transport, [online], [searched on May 8, 2013], Internet <URL: http://mpeg.chiariglione.org/standards/mpeg-h/mpeg-media-transport>

SUMMARY OF INVENTION

Problem to be Solved by the Invention

An object of the present technology is to transmit well file contents.

Means for Solving the Problem

A concept of the present technology is a transmitting apparatus, including:
a transmission stream generating unit for generating a transmission stream where a first transmission packet where transmission media is included in a payload and a second transmission packet where information relating to the transmission media is included in the payload are time division multiplexed;
a transmission stream transmitting unit for transmitting the transmission stream to a receiving side through a predetermined transmission path; and
an information insertion unit for inserting first information relating to predetermined contents into a header of the first transmission packet, if the transmission media included in the payload of the first transmission packet is file data configuring the predetermined contents.

According to the present technology, the transmission stream generating unit generates a transmission stream where a first transmission packet where transmission media is included in a payload and a second transmission packet where information relating to the transmission media is included in the payload are time division multiplexed. For example, the transmission packet may be an MMT (MPEG Media Transport) packet. The transmission stream transmitting unit transmits the transmission stream to a receiving side through a predetermined transmission path.

The information insertion unit inserts first information relating to predetermined contents into a header of the first transmission packet, if the transmission media included in the payload of the first transmission packet is file data configuring the predetermined contents.

For example, the first information may include content descriptor information of identifying the predetermined contents. For example, the first information may include a content version showing an update of the file data configuring the predetermined contents. For example, the first information may include information relating to a part number if the whole predetermined contents are divided into a predetermined number of packets and a part identifier for identifying each part.

According to the present technology, information relating to predetermined contents is inserted into a header of the first transmission packet that includes file data configuring the contents. Accordingly, at the receiving side, the transmission packet including the file data configuring the predetermined contents can be acquired easily and accurately based on the information.

According to the present technology, the information insertion unit may insert second information relating to the predetermined contents into the payload of the second transmission packet, for example. The second information may include content identifier information for identifying the predetermined contents, for example.

Also, the second information may include content version information showing an update of file data configuring the predetermined contents, for example. The second information may include reference information configuring the predetermined contents. The reference information may be an URI (Uniform Resource Identifier).

The second information may include information relating to an expire date of the predetermined contents, for example. The second information may include estimated update time information of the predetermined contents.

In this manner, by inserting the information relating to the predetermined contents into the payload of the transmission packet, at the receiving side, the content identification of the predetermined contents included in the transmission stream, and the file information configuring the contents can be perceived easily.

Other concept of the present technology is a receiving apparatus, including:
a transmission stream receiving unit for receiving a transmission stream from a transmission side through a predetermined transmission path, the transmission stream where a first transmission packet where transmission media is included in a payload and a second transmission packet where information relating to the transmission media is included in the payload are time division multiplexed,
in which first information relating to predetermined contents is inserted into a header of the first transmission packet, if the transmission media included in the payload of the first transmission packet is file data configuring the predetermined content; and
a file data acquisition unit for filtering the first transmission packet including file data configuring the predetermined contents from the transmission stream using the first information, and acquiring the file data configuring the predetermined contents from the first transmission packet filtered.

According to the present technology, a transmission stream receiving unit receives a transmission stream from a transmission side through a predetermined transmission path. In the transmission stream, a first transmission packet where transmission media is included in a payload and a second transmission packet where information relating to the transmission media is included in the payload are time division multiplexed. First information relating to predetermined contents is inserted into a header of the first transmission packet, if the transmission media included in the payload of the first transmission packet is file data configuring the predetermined content.

A file data acquisition unit acquires file data configuring predetermined contents from a transmission stream. In this case, the first information is used, the first transmission packet including the file data configuring the predetermined contents is filtered, and the file data configuring the predetermined contents is acquired from the first transmission packet filtered.

In this manner, by inserting the information relating to the predetermined contents into the header of the first transmission packet including the file data configuring the predetermined contents, the file data configuring the predetermined contents is acquired based on the information. Accordingly, the file data configuring the predetermined contents can be acquired easily and accurately.

According to the present technology, second information relating to the predetermined contents is inserted into the payload of the second transmission packet, and the file data acquisition unit filters the first transmission packet including the first information corresponding to the second information.

Effects of the Invention

According to the present technology, the file contents can be transmitted well. The effects described in the specification are only illustrative and are not limited thereto, and additional effects may be provided.

BRIEF DESCRIPTION OF DRAWINGS

FIG. 6 A diagram illustrating main parameters of a PA Message.

FIG. 7 A diagram showing descriptions of main parameters of a MP Table.

FIG. 8 A diagram showing a configuration example of a file content descriptor (file_content_descriptor).

FIG. 9 A diagram showing descriptions of main parameters of a file content descriptor.

FIG. 11 A diagram showing descriptions of main parameters of an MMT packet header.

MODE(S) FOR CARRYING OUT THE INVENTION

Hereinafter, an embodiment of the present technology will be described. The embodiments of the present technology will be described in the following order.
1. Embodiments
2. Alternative Embodiment

1. EMBODIMENTS

[Configuration Example of Broadcasting System]

Figure 1:
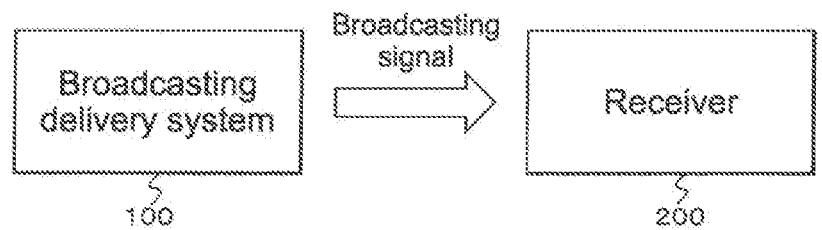
FIG. 1 A block diagram showing a configuration example of a transmitting and receiving system according to an embodiment.

FIG. 1 shows a configuration example of a transmitting and receiving system 10 according to an embodiment. The transmitting and receiving system 10 is configured of a broadcasting delivery system 100 and a receiver 200.

The broadcasting delivery system 100 transmits a broadcasting signal including transmission media of an IP (Internet Protocol) system. The transmission media includes Timed Media and Non-Timed Media. For example, the Timed Media are stream data of video, audio, caption etc. For example, the Non-Timed Media are file data of HTML document data, or other data.

A receiver 200 receives the broadcasting signal of the above-described IP system transmitted from the broadcasting delivery system 100. Then, the receiver 200 acquires the transmission media such as video and audio from the broadcasting signal, and presents an image, a sound, a voice or the like.

Figure 2:
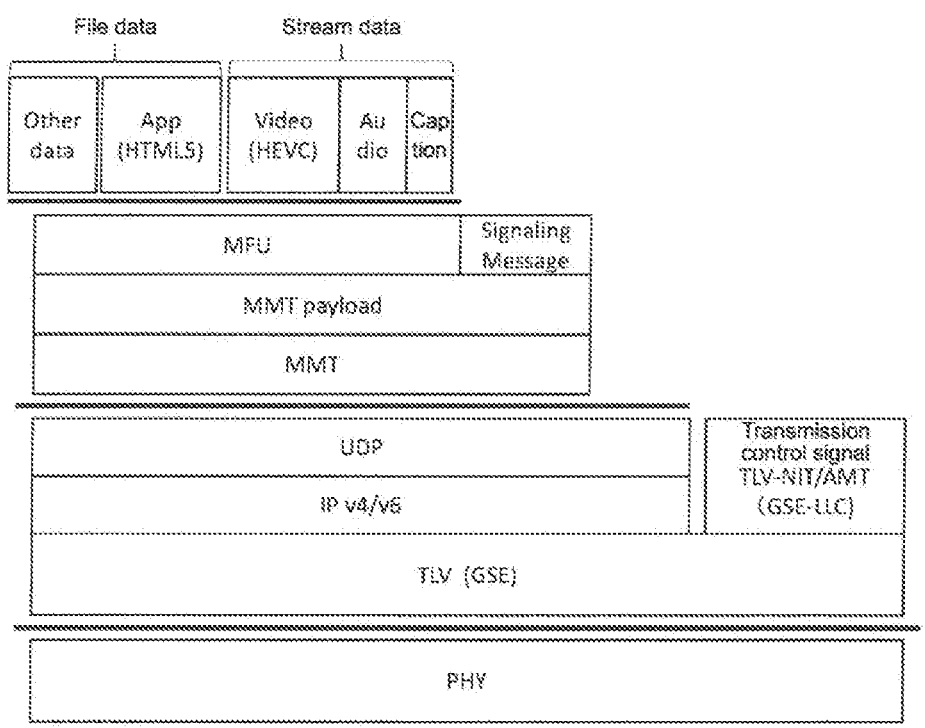
FIG. 2 A stack model showing a configuration example of a broadcasting signal.

FIG. 2 is a stack model showing a configuration example of the broadcasting signal. At a lower level, there is a physical layer (PHY). The physical layer includes a modulation system, an error correction system or the like. Over the physical layer, there are transmission packet layers of a TLV (Type Length Value) a GSE (Generic Stream Encapsulation).

Over the transmission packet of the TLV or the GSE, an IP packet is loaded. Over the IP packet, a UDP (User Datagram Protocol) is further loaded. On the other hand, over the transmission packet of the TLV or the GSE, a transmission control signal is loaded as signaling information.

Also, over the UDP, an MMT packet is loaded. In a payload unit of the MMT packet, an MFU (MMT Fragment Unit) or a signaling Message is included. As the MFU, the stream data such as video and audio, and the file data such as HTML document data or other data are inserted.

Figure 3:
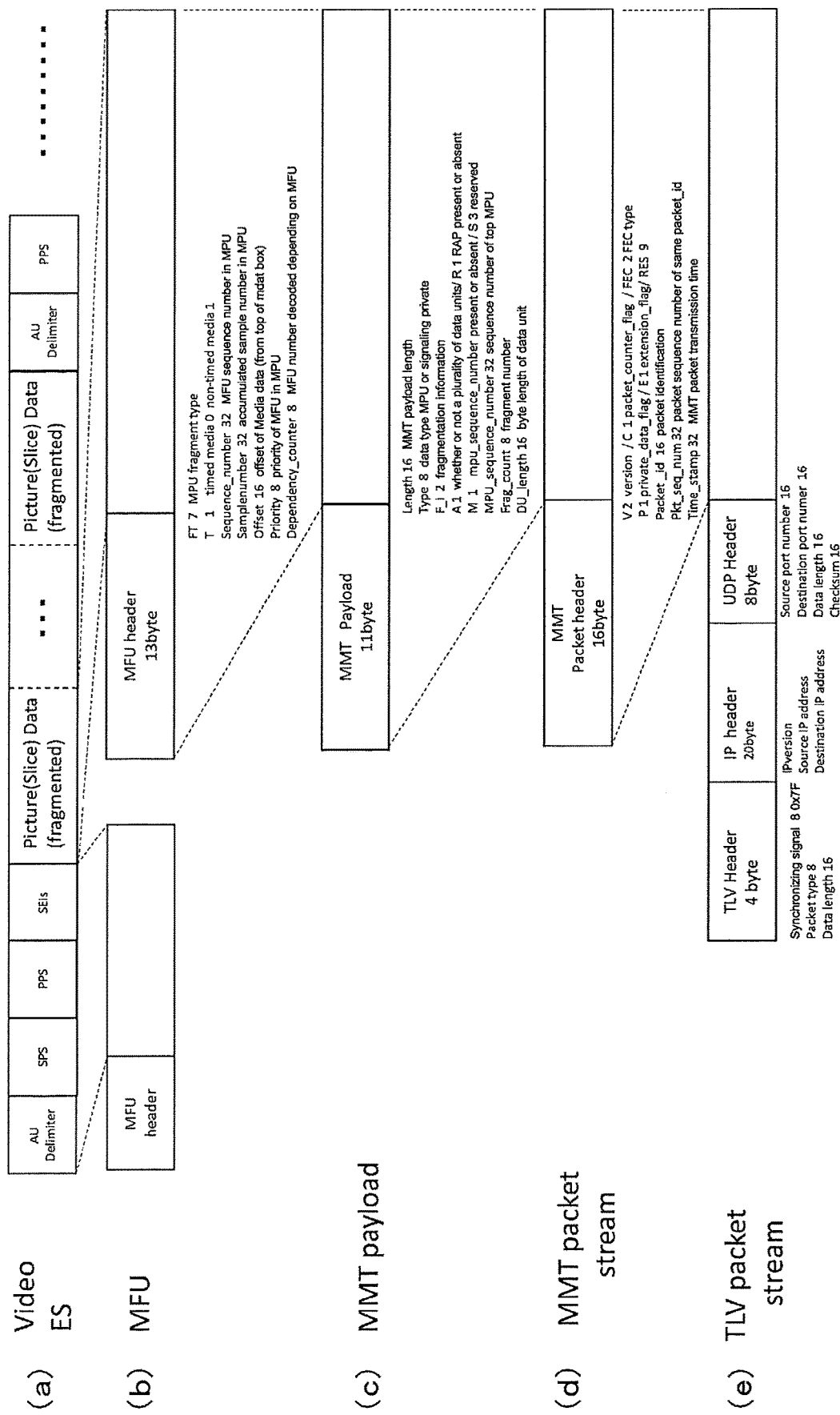
FIG. 3 A diagram showing a configuration example of a broadcasting stream in the case of transmitting Timed Media.

FIG. 3 shows a configuration example of a broadcasting stream (broadcasting signal) in the case of transmitting the Timed Media. FIG. 3(a) shows an elementary stream of video (Video ES). The elementary stream of video is divided into a predetermined size of blocks, and is disposed at the payload of the MFU, as shown in FIG. 3(b).

As shown in FIG. 3(c), an MMT payload header is added to the MFU to configure an MMT payload. As shown in FIG. 3(d), an MMT packet header is further added to the MMT payload to configure an MMT packet. Although not shown, in the payload, there is also an MMT packet including a signaling message such as a PTS that shows a presentation time of each picture.

As shown in FIG. 3(e), a UDP header, an IP header and a TLV header are added to the MMT packet to generate a TLV packet that configures a broadcasting stream. Although not shown, as the TLV packet, there is a TLV packet including the MMT packet of other transmission media such as audio and caption.

Figure 4:
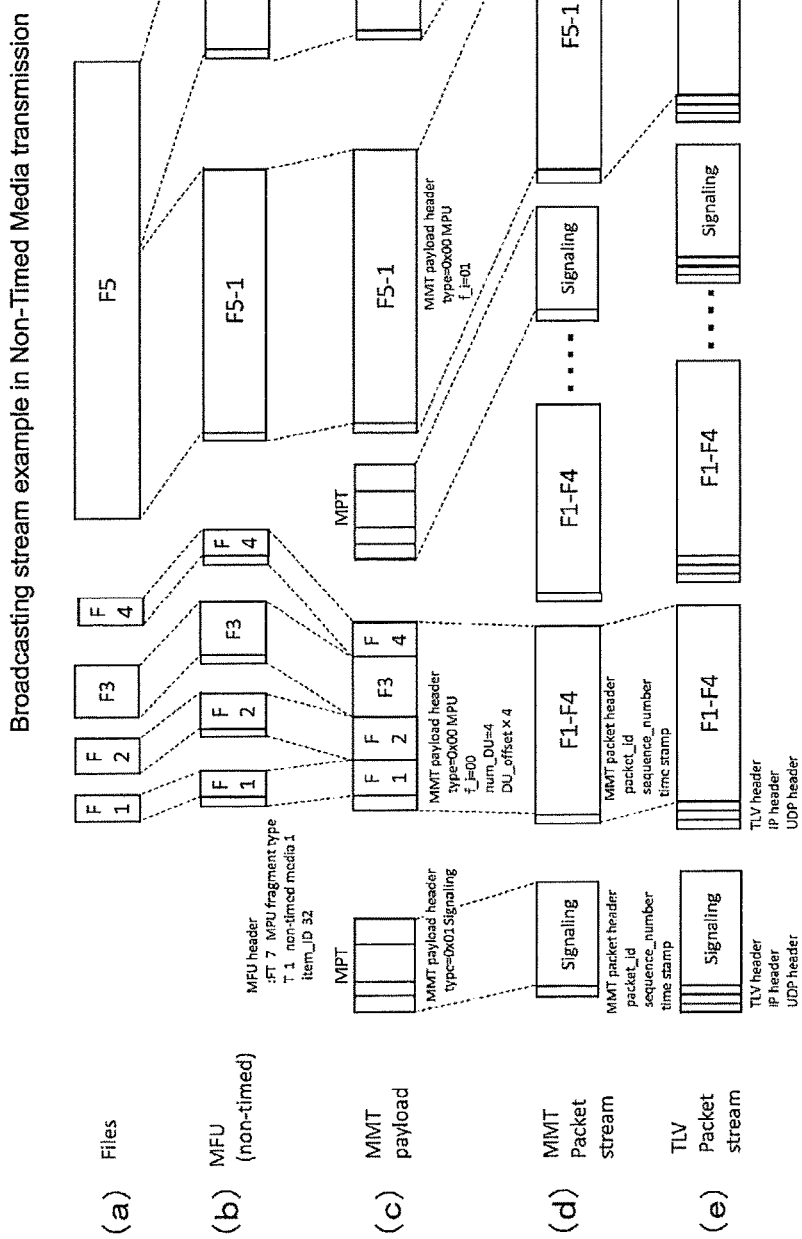
FIG. 4 A diagram showing a configuration example of a broadcasting stream in the case of transmitting Non-Timed Media.

FIG. 4 shows a configuration example of a broadcasting stream (broadcasting signal) in the case of transmitting Non-Timed Media. FIG. 4(a) shows file data. Each of F1, F2, F3, F4 and F5 shows one file data. For example, each of F1 to F4 is file data used for one program, and F5 is file data used for next program.

As each file data of F1 to F4 has a small file size, the file data is disposed in the payload of the MFU, as shown in FIG. 4(b). On the other hand, the file data of F5 has a great file size, the file data is divided into plural blocks, here into two blocks, each of which is disposed in the payload of the MFU, as shown in FIG. 4(b).

At a header of the MFU where the file data is disposed in the payload, there is an "item ID" 32 bits field showing a file ID. Here, the file IDs of the respective MFUs where the file data of F1 to F5 is disposed in the payload have different values. The file IDs of the two MFUs where the file data of F5-1 and F5-2 divided from the file data of F5 are disposed in the payload have the same value.

As shown in FIG. 4(c), an MMT payload header (MMT payload header) is added to the MFU, thereby configuring the MMT payload. In this case, the MFU including the file data of F1 to F4 has a small size, and is therefore disposed in one MMT payload. On the other hand, the MFU including the file data of F5-1 and F5-2 is disposed in one MMT payload. As shown in FIG. 4(d), the MMT packet header is further added to the MMT payload, thereby configuring the MMT packet.

In some of the MMT packets, the payload includes signaling messages. One of the signaling messages is a PA message (Package Access Message) including an MP Table (MPT: MMT Package Table). Although the details are described below, contents information configured of the file data is inserted into the MP Table. A "Type" 8 field present at the MMT payload header can identify whether or not the payload includes the signaling messages or the transmission media (stream data, file data).

As described above, in one program, the file data of F1 to F4 is repeatedly transmitted in the MMT packet stream layer. The MP Table transmitted corresponding to the file data of F1 to F4 includes contents information configured of the file data of F1 to F4. In the next program, the file data of F5-1 and F5-2 is repeatedly transmitted in the MMT packet stream layer. The MP Table transmitted corresponding to the file data of F5-1 and F5-2 includes contents information configured of the file data of F5-1 and F5-2.

As shown in FIG. 4(e), the UDP header, the IP header and the TLV header are added to the MMT packet, thereby generating a TLV packet configuring the broadcasting stream.

Figure 5:
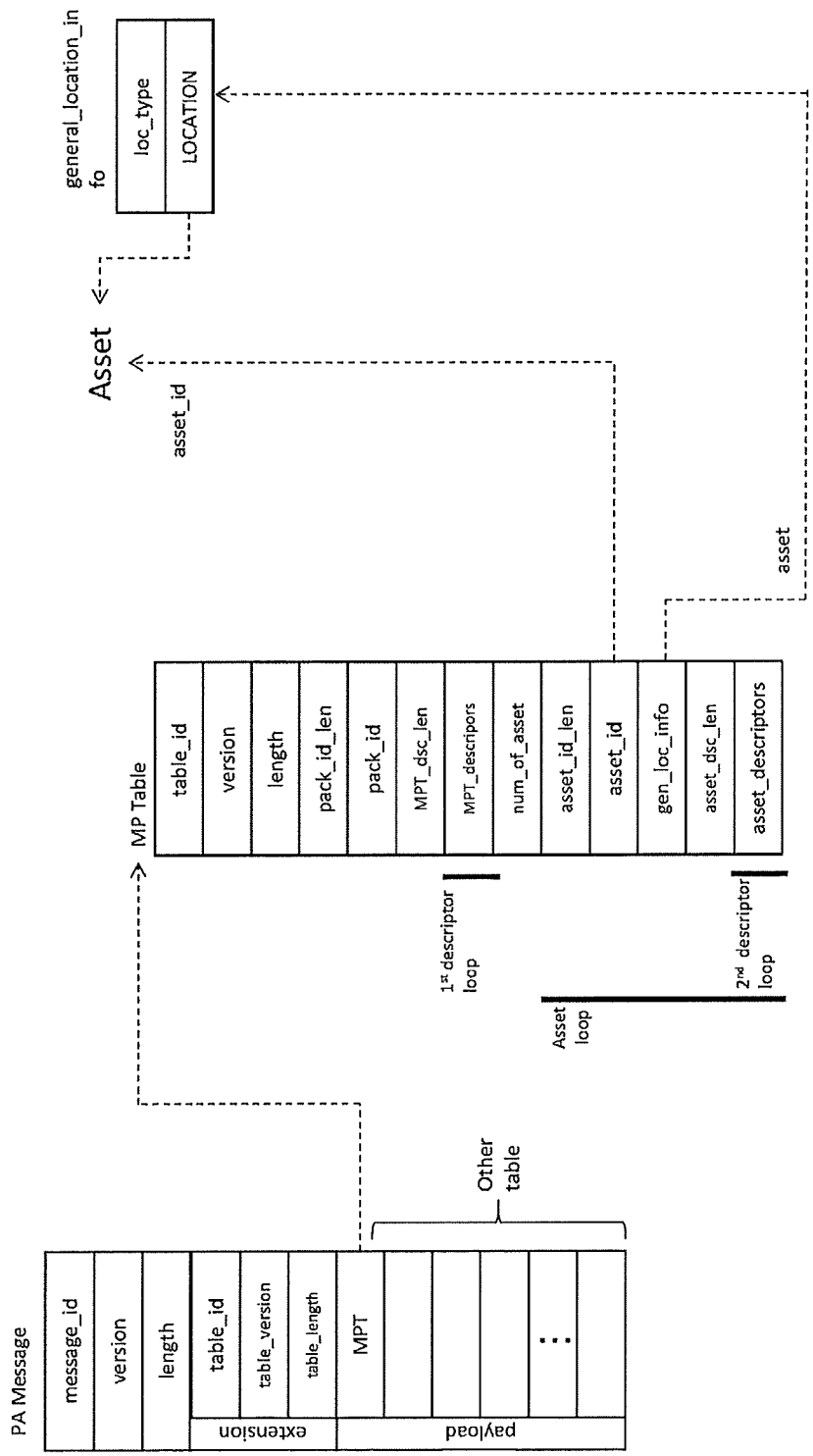
FIG. 5 A drawing showing a configuration example of a PA (Package Access) Message and an MP Table (MPT: MMT Package Table).

FIG. 5 shows a configuration example of a PA (Package Access) Message and an MP Table (MPT: MMT Package Table). FIG. 6 illustrates main parameters of the PA Message. FIG. 7 shows descriptions of main parameters of the MP Table.

A "message_id" is a fixed value of identifying the PA message in a variety of signaling information. A "version" is an 8 bits integer value showing a version of the PA message. For example, if any part of the parameters configuring the MP Table is updated, the value is incremented by +1. A "length" is a byte count showing the size of the PA message counted immediately after the field.

In fields of an "extension", index information of a table disposed in fields of the payload is disposed. In the fields, a "table_id", a "table_version" and a "table_length" are disposed for each table. The "table_id" is a fixed value of identifying the table. The "table_version" shows a version of the table. The "table_length" is a byte count showing a size of the table.

In the fields of the payload of the PA message, the MP table (MPT) and a predetermined number of other tables are disposed. Hereinafter, the configuration of the MP table will be described.

A "table_id" is a fixed value of identifying the MP Table in a variety of signaling information. A "version" is an 8 bits integer value showing the version of the MP Table. For example, if any part of the parameters configuring the MP Table is updated, the value is incremented by +1. A "length" is a byte count showing the size of the MP table counted immediately after the field.

A "pack_id" is identification information including all signals and files transmitted by the broadcasting signal as a whole package. The identification information is text information. A "pack_id_len" shows the size (byte count) of the text information. An "MPT descriptors" field is an storage area of descriptors over a whole package. An "MPT_dsc_len" shows the size (byte count) of the field.

A "num_of_asset" shows the number of assets (signals, files) configuring the package. For the number, the following asset loops are disposed. An "asset_id" is information of uniquely identifying an asset (asset ID). The identification information is text information. An "asset_id_len" shows a size (byte count) of the text information.

A "gen_loc_info" is information showing a location of acquiring the asset. The information includes a "loc_type" and "LOCATION". In other words, to the "LOCATION", specific information can be inserted per location type. In the embodiment, the location type shows other packet in the channel to which the MPT is transmitted, and the packet ID (Packet_id) is disposed at the "LOCATION". By the packet ID and the above-described asset ID, the asset is specified.

An "asset descriptors" field is a storage area of a descriptor relating to the asset. An "asset_dsc_len" shows a size (byte count) of the field. In the embodiment, if the asset is the file data, as the descriptor stored in the "asset descriptors" field, a file content descriptor (file_content_descriptor) is newly defined. The file content descriptor shows that what kind of file data is transmitted when the file data is transmitted as the asset.

FIG. 8 shows a configuration example of the file content descriptor (file_content_descriptor). FIG. 9 shows descriptions of main parameters of the descriptor. A "descriptor_tag" 16 bits field shows a descriptor type, and shows here the file content descriptor. A "descriptor_length" 16 bits field shows a size of the descriptor, and shows the byte count later.

A "content_id" 24 bits field shows an ID (contents ID) of identifying the contents that are specific use units as a whole file group transmitted. A "content_version" 8 bits field shows a version of the contents having the specific contents ID. If any part of the files configuring the contents is updated, the value is incremented by +1. A "content_type" shows types of the contents. Examples include data broadcasting contents, storage broadcasting contents, and contents for updating receiver software. Examples of the storage broadcasting contents include video image contents, music contents, and game contents.

A "number_of_Base_URI_byte" 8 bits field shows the byte count of the "Base_URI_byte". The field of the "Base_URI_byte" shows a reference URI (Uniform Resource Identifier) common to each file configuring the contents. The field also shows a communication acquisition destination if it is not acquired by broadcasting.

A "number_of_files" 8 bits field shows the number of the files configuring the contents. For the number, the following item loops are disposed. An "item_ID" 16 bits field is an ID for identifying the file (item). The value is set to the same added to the above-described MFU header. An "item version" 8 bits field shows the version of the file. If the file contents are updated, the value is incremented by +1.

A "media_type" 16 bits field shows a media classification and an encoding system of the file data. An "item_size" 32 bits field shows the data size of the file by the byte count. A "number_of_URI_bytes" 8 bits field shows the byte count of the "item_URI_bytes". An "item_URI_byte" field shows a URI per file. If a Base_URI is designated, the URI of the file is provided by a character string connected to the Base_URI.

An "expire_date" 40 bits field shows an expire date of the contents. Holding the file after the expiration date is inhibited. An "estimated_update_time" 40 bits field shows an estimated time when the contents are changed, or the contents are updated next. If the same contents are updated regularly, the contents are acquired one time during the transmission, and the same contents are transmitted repeatedly, the same contents may not be received. By utilizing the information relating to the estimated time, once it reaches the time to be updated, the contents are received, thereby acquiring the contents updated. Thus, the contents can be acquired effectively.

Figure 10:
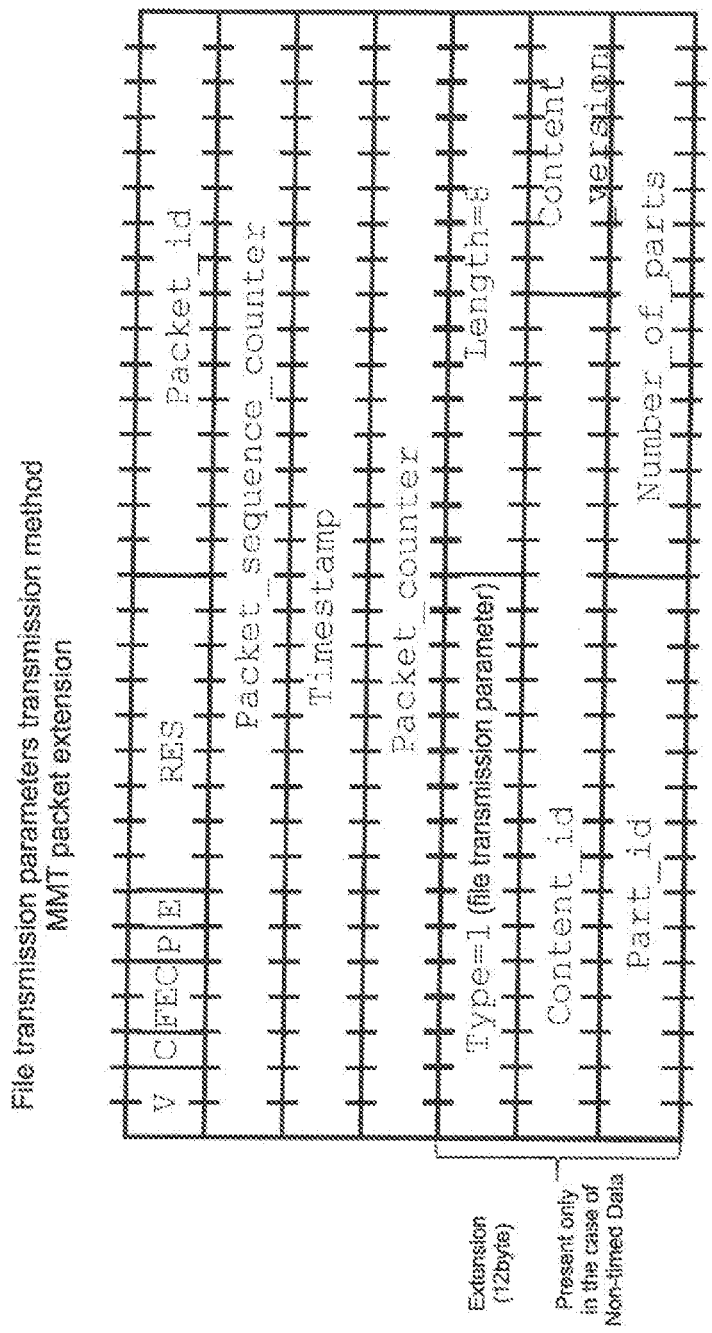
FIG. 10 A diagram showing a configuration example of an MMT Packet header where file data is included in a payload.

FIG. 10 shows a configuration example of the MMT packet header where the file data is included in the payload. In this example, a 12 bytes header extension is disposed. FIG. 11 shows descriptions of main parameters of the extension. A "Type" 16 bits field shows a type of the extension, and here a file transmission parameter is disposed.

A "length" 16 bits field shows the size of the extension, i.e., the byte count later, here 8 bytes. A "content_id" 24 bits field shows an ID (contents ID) of identifying the contents that are specific use units as the whole file group transmitted. A "content_version" 8 bits field shows a version of the contents having the specific contents ID. If any part of the files configuring the contents is updated, the value is incremented by 41. A "content_id" and the "content_version" correspond to the "content_id" and the "content version" of the above described file content descriptor.

A "Part_id" 16 bits field is an ID for identifying each part divided, if the whole contents are divided into each packet. A "Number_of_parts" 16 bits field shows the number of parts divided, if the whole contents are divided into each packet. The "Part_id" and the "Number_of_parts" will be keys to acquire all file data configuring the contents at a receiving side.

Figure 12:
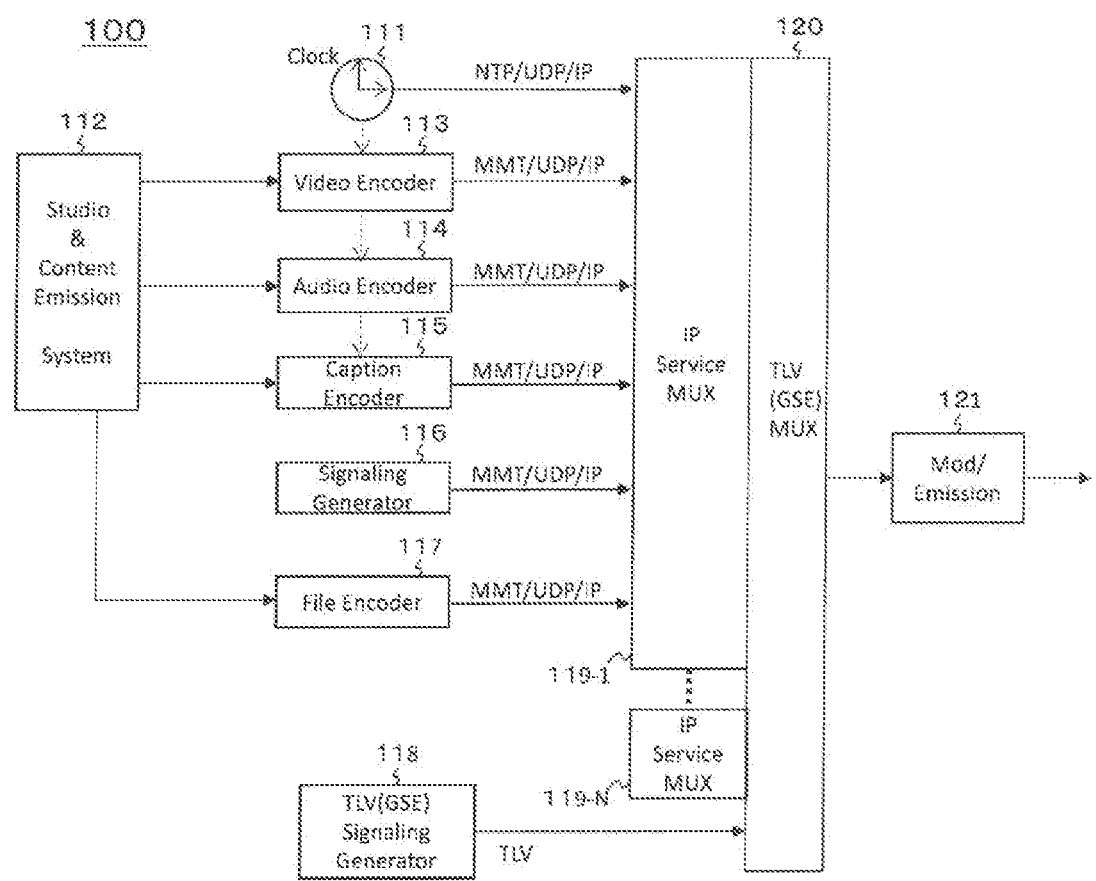
FIG. 12 A diagram showing a configuration example of a broadcasting delivery system.

FIG. 12 shows a configuration example of a broadcasting delivery system 100. The broadcasting delivery system 100 includes a clock unit 111, a signal transmitter 112, a video encoder 113, an audio encoder 114, a caption encoder 115, a signaling generator 116, and a file encoder 117. Also, the broadcasting delivery system 100 includes a TLV (GSE) signaling generator 118, N numbers of IP service multiplexers 119-1 to 119-N, a TLV (GSE) multiplexer 120, and a modulator/transmitter 121.

The clock unit 111 generates time information (NTP time information) synchronized with time information acquired from an NTP (Network Time Protocol) server (not shown), and transmits an IP packet including the time information to the IP service multiplexer 119-1. The signal transmitter 112 is a TV studio or a recording/reproducing apparatus such as a VTR, and transmits Timed Media of stream data such as video, audio and caption, and Non-Timed Media of file data such as HTML document data to each encoder.

The video encoder 113 encodes and packets the video signal transmitted from the signal transmitter 112, and transmits the IP packet including the MMT packet of the video to the IP service multiplexer 119-1. The audio encoder 114 encodes and packets an audio signal transmitted from the signal transmitter 112, and transmits the IP packet including the MMT packet of the video to the IP service multiplexer 119-1.

The caption encoder 115 encodes and packets a caption signal transmitted from the signal transmitter 112, and transmits the IP packet including the MMT packet of the caption to the IP service multiplexer 119-1. The signaling generator 116 generates a signaling message such as the PA message (see FIG. 5), and transmits an IP packet including the MMT packet where the signaling message is disposed at the payload unit to the IP service multiplexer 119-1.

The file encoder 117 synthesizes or divides the file data transmitted from the signal transmitter 112 as necessary, generates the MMT packet including the file data (see FIG. 4(c), (d)), and transmits the IP packet including the MMT packet to the IP service multiplexer 119-1. The IP service multiplexer 119-1 carries out time division multiplexing of the IP packet transmitted from each encoder. In this case, the IP service multiplexer 119-1 adds a TLV (GSE) header to each IP packet to provide a TLV (GSE) packet.

The IP service multiplexer 119-1 configures one channel part within one transponder. The IP service multiplexers 119-2 to 119-N have the same function as the IP service multiplexer 119-1, and configure other channel parts within the one transponder.

The TLV (GSE) signaling generator 118 generates signaling information, and generates the TLV (GSE) packet that disposes the signaling information at the payload unit. The TLV (GSE) multiplexer 120 multiplexes the TLV (GSE) packet that are generated at the IP service multiplexers 119-1 to 119-N and the TLV (GSE) signaling generator 118, and generates a broadcasting stream (see FIG. 3(e), FIG. 4(e)). The modulator/transmitter 121 carries out RF modulation processing to the broadcasting stream generated at the TLV (GSE) multiplexer 120, and transmits the broadcasting stream to the RF transmission path.

An operation of the broadcasting delivery system 100 shown in FIG. 12 will be simply described. At the clock unit 111, the time information synchronized with the time information acquired from the NTP server is generated, and the IP packet including the time information is generated. The IP packet is transmitted to the IP service multiplexer 119-1.

A video signal transmitted from the signal transmitter 112 is fed to the video encoder 113. The video encoder 113 encodes and packets the video signal, and the IP packet including the MMT packet of the video is generated. The IP packet is transmitted to the IP service multiplexer 119-1.

The audio signal and the caption signal transmitted from the signal transmitter 112 are processed similarly. Then, the IP packet including the MMT packet of the audio generated at the audio encoder 114 is transmitted to the IP service multiplexer 119-1, the IP packet including the MMT packet of the caption generated at the caption encoder 115 is transmitted to the IP service multiplexer 119-1.

At the signaling generator 116, the signaling message (including the PTS) is generated, the IP packet including the MMT packet where the signaling message is disposed at the payload unit is generated. The IP packet is transmitted to the IP service multiplexer 119-1.

The file data transmitted from the signal transmitter 112 is fed to the file encoder 117. At the file encoder 117, the file data is synthesized or divided as necessary, and the MMT packet including the file data is generated. Further, the LP packet including the MMT packet is generated. The IP packet is transmitted to the IP service multiplexer 119-1.

At the IP service multiplexer 119-1, the time division multiplexing is done on the IP packet transmitted from each encoder and signaling generator 116. At this time, the TLV (GSE) header is added to each IP packet to provide the TLV (GSE) packet. At the IP service multiplexer 119-1, one channel part entered into one transponder is processed. At the IP service multiplexers 119-2 to 119-N, other channel parts entered into the one transponder is processed.

The TLV (GSE) packet provided at IP service multiplexer 119-1 to 119-N is transmitted to the TLV (GSE) multiplexer 120. To the TLV (GSE) multiplexer 120, the TLV (GSE) packet where the signaling (signaling) information is disposed at the payload unit from the TLV (GSE) signaling generator 118 is transmitted.

At the TLV (GSE) multiplexer 120, the TLV (GSE) packet generated at the IP service multiplexers 119-1 to 119-N and the TLV (GSE) signaling generator 118 is multiplexed, and the broadcasting stream is generated. The broadcasting stream is transmitted to the modulator/transmitter 121. At the modulator/transmitter 121, the RF modulation processing is carried out on the broadcasting stream, and the RF modulated signal is transmitted to the RF transmission path.

Figure 13:
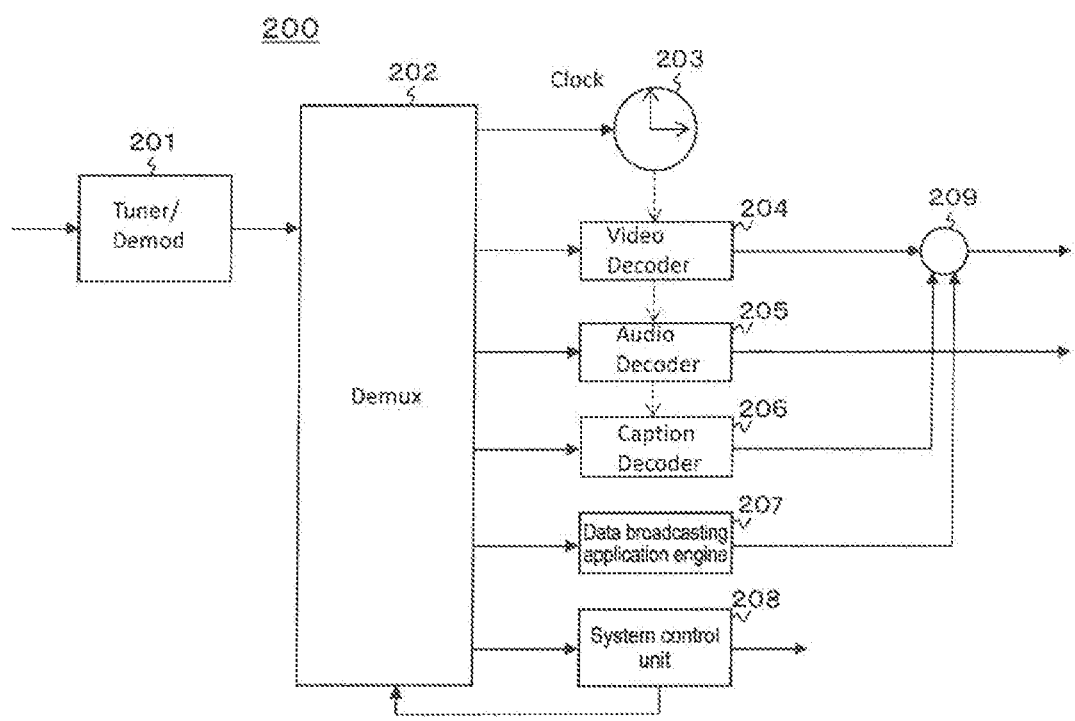
FIG. 13 A diagram showing a configuration example of a receiver.

FIG. 13 shows a configuration example of the receiver 200. The receiver 200 includes a tuner/demodulator 201, a demultiplexer 202, a clock unit 203, a video decoder 204, an audio decoder 205, a caption decoder 206, a data broadcasting application engine 207, a system control unit 208, and a synthesis unit 209.

The tuner/demodulator 201 receives the RF modulated signal, and carries out the demodulation processing to provide the broadcasting stream (see FIG. 3(e), FIG. 4(e)). The demultiplexer 202 carries out the demultiplexing processing and depacketting processing on the broadcasting stream to output NTP time information, a PTS (presentation time information), signaling information, encoded signals of video, audio, and caption, and file data. Here, the file data configures data broadcasting contents.

The system control unit 208 controls each unit of the receiver 200 based on signaling information provided at the demultiplexer 202 and operation information from a user operation unit (not shown). The clock unit 203 generates time information synchronized with NTP time information based on the NTP time information provided at the demultiplexer 202.

The video decoder 204 decodes the encoded video signal provided at the demultiplexer 202 to provide a base band video signal. The audio decoder 205 decodes the encoded audio signal provided at demultiplexer 202 to provide a base band audio signal. The caption decoder 206 decodes the encoded caption signal provided at the demultiplexer 202 to provide a caption display signal.

The data broadcasting application engine 207 processes the file data provided at the demultiplexer 202 to provide the data broadcasting display signal. To the broadcasting stream, the file data having the same contents is repeatedly transmitted. The system control unit 208 controls a filtering operation at the demultiplexer 202 such that only the file data as necessary for the demultiplexer 202 is acquired.

The system control unit 208 controls the filtering operation by referring the file content descriptor (file_content_descriptor) included in the MP Table (MPT: MMT Package Table) within the above-described PA message. The file acquisition processing in the demultiplexer 202 will be described later in detail.

The system control unit 208 controls a decode timing in each decoder based on the PTS (presentation time information) to adjust a presentation timing of video, audio, and caption. The synthesis unit 209 synthesizes the base band video signal with the caption display signal and the data broadcasting display signal to provide a video signal for video image display. The base band audio signal provided at the audio decoder 205 will be an audio signal for a voice output.

The operation of the receiver 200 shown in FIG. 13 will be conveniently described. The tuner/demodulator 201 receives an RF modulated signal transmitted through the RF transmission path, and carries out the demodulation processing to provide the broadcasting stream (see FIG. 3(e), FIG. 4(e)). The broadcasting stream is transmitted to the demultiplexer 202.

The demultiplexer 202 carries out the demultiplexing processing and depacketting processing on the broadcasting stream to extract the NTP time information, the PTS, the signaling information, the encoded signals of video, audio, and caption, and the file data configuring the data broadcasting contents.

The NTP time information extracted at the demultiplexer 202 is transmitted to the clock unit 203. The clock unit 203 generates time information synchronized with the NIP time information. In other words, the clock unit 203 regenerates time information that matches with the time information generated at the clock unit 111 of the broadcasting delivery system 100.

The encoded video signal extracted at the demultiplexer 202 is transmitted to the video decoder 204 and decoded, thereby providing the base band video signal. The encoded caption signal extracted at the demultiplexer 202 is transmitted to the caption decoder 206 and decoded to provide the caption display signal. The file data extracted at the demultiplexer 202 is transmitted to the data broadcasting application engine 207 and is processed to provide the data broadcasting display signal. The video signal and the display signal are synthesized at the synthesis unit 209, thereby providing the video signal for video image display.

The encoded audio signal extracted at the demultiplexer 202 is transmitted to the audio decoder 205 and decoded to provide a base band audio signal for a voice output.

Figure 14:
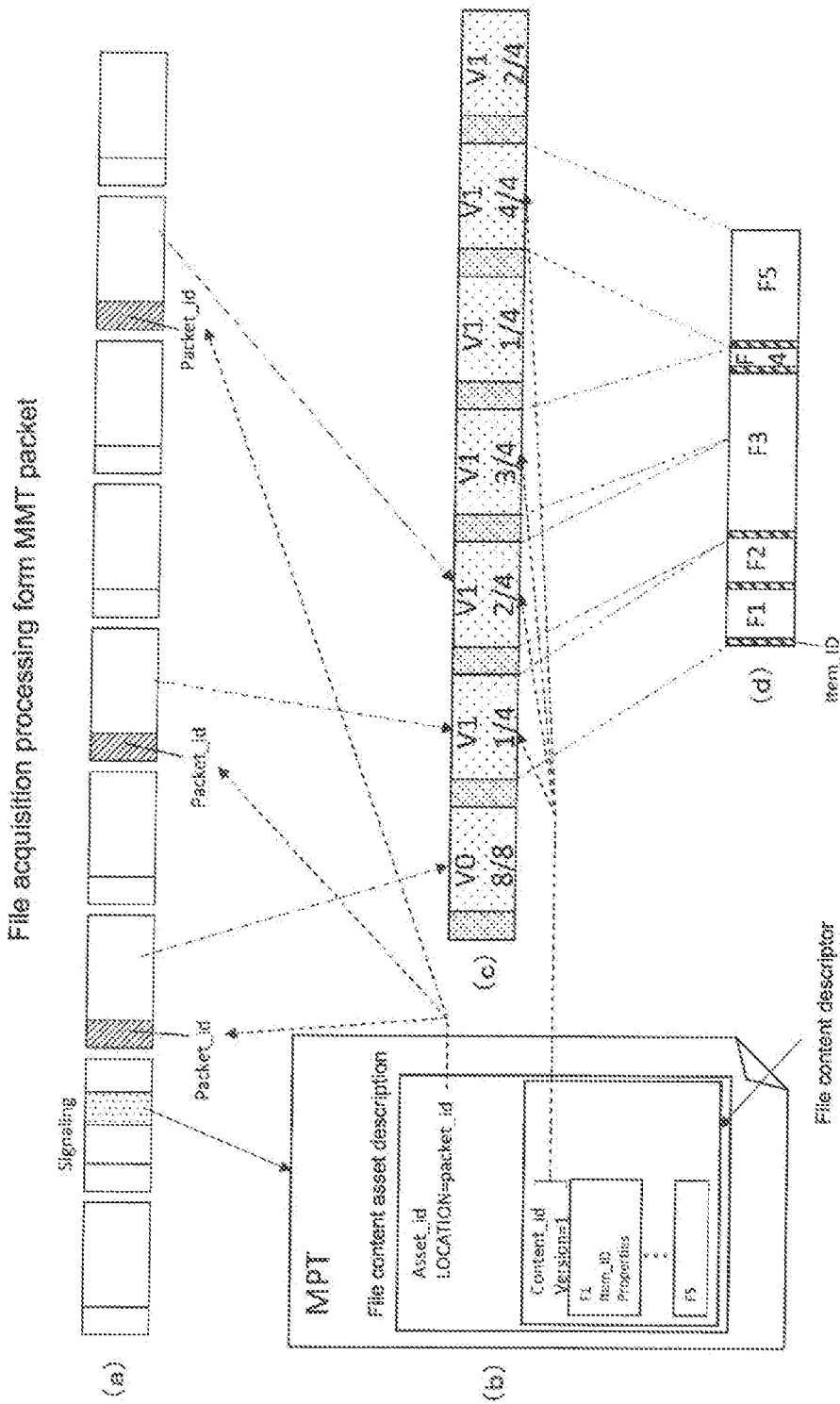
FIG. 14 A diagram illustrating an example of file acquisition processing in a demultiplexer.

Referring to FIG. 14, an example of file acquisition processing in the demultiplexer 202 will be described. FIG. 14(a) shows an MMT packet steam. In the MMT packet stream, there are MMT packet including the file data configuring the contents and MMT packet including the signaling message.

The PA message that is the signaling message includes the MP Table (MPT). In the MP Table, as shown in FIG. 14(b), there is file content asset description. The file content asset description includes identification information (asset ID) of the file content asset and a packet ID (packet_id) for identifying the asset, i.e., the MMT packet including the file data.

The file content asset description includes the file content descriptor (file_content_discriptor) (see FIG. 8). In the file content descriptor, there are information relating to a content identification ID (content ID), a version descriptor of the content and each file (file data) configuring the content.

Firstly, in the demultiplexer 202, as shown in FIG. 14(c), based on the packet ID of the file content asset descriptor, the MMT packet having the same packet ID is filtered from the MMT packet stream.

Next, in the demultiplexer 202, as shown in FIG. 14(d), based on the content ID and the content version of the file content descriptor, the MMT packet having the same content ID and the content version in the extension of the MMT packet header is filtered. In FIG. 14(c), "V0" shows that the content ID and the content version are different, and "V1" shows that the content ID and the content version are same.

In this case, in the demultiplexer 202, based on the information of "Part_id" and "Number_of_parts" in the extension of the MMT packet header, the MMT packet including each part where the whole contents are decomposed is extracted without duplication, and all file data configuring the contents described in the file content descriptor is acquired. In the example shown, five file data from f1 to f5 where the contents are decomposed into four parts are acquired.

Figure 15:
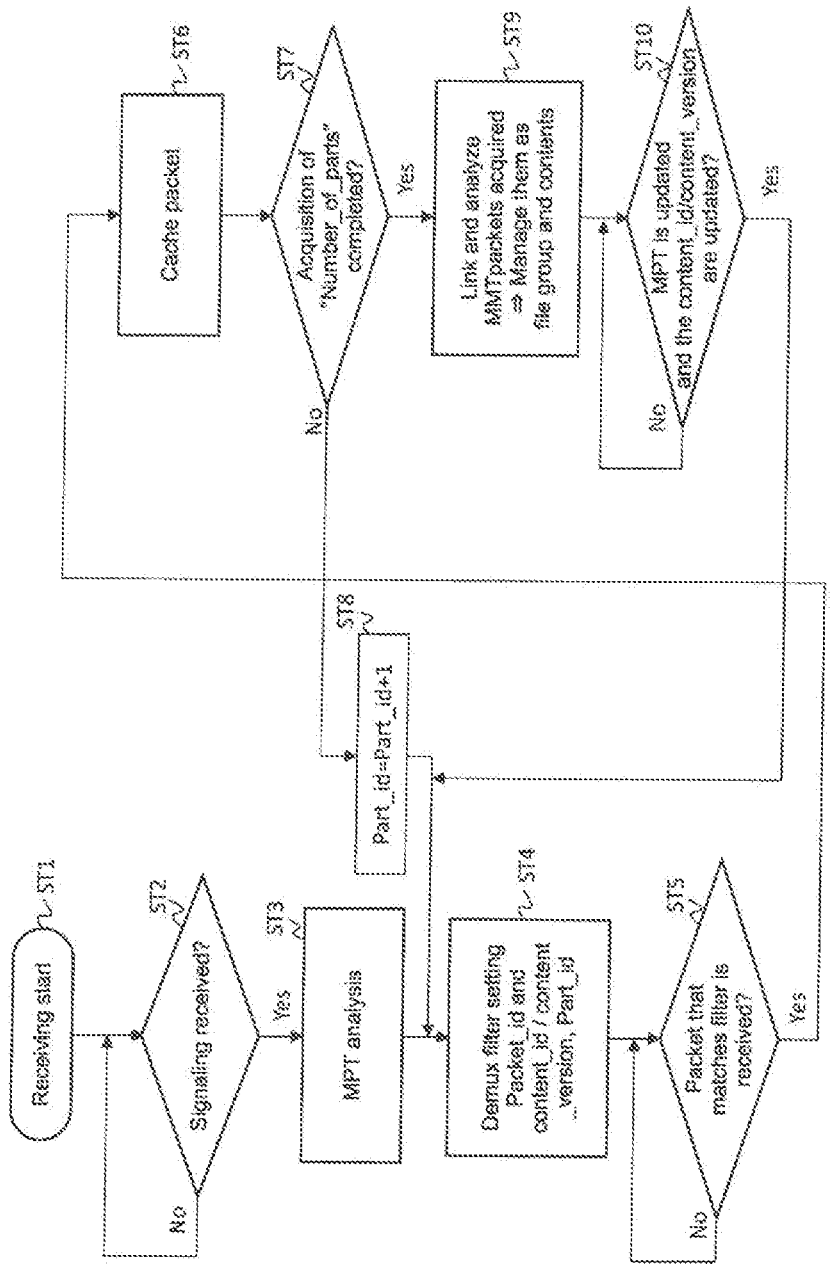
FIG. 15 A diagram illustrating an example of file reception processing flow in a receiver.

FIG. 15 illustrates a file reception processing flow in the receiver 200. The receiver 200 starts receiving in step ST1, and then moves to step ST2. In step ST2, it determines whether or not the signaling message including the PA message is received.

If the signaling message is received, the receiver 200 moves to step ST3. In step ST3, the receiver 200 analyzes the MP table (MPT). The receiver 200 carries out filter setting of the demultiplexer 202 in step ST4.

Next, the receiver 200 decides whether or not the MMT packet that matches the filter is received in step ST5. If received, the receiver 200 caches the MMT packet in step ST6. The receiver 200 determines whether or not acquisition of the parts shown in the "Number_of_parts" is completed. If the acquisition is not completed, the receiver 200 increments the "Part_id" by +1 in step ST8, and returns to step ST4 for the acquisition processing of next parts.

If the acquisition of the parts shown in the "Number_of_parts" is completed in step ST7, the receiver 200 moves to step ST9. In step ST9, the receiver 200 links and analyzes the MMT packets acquired, and manages them as the file group and contents.

Next, the receiver 200 determines whether or not the MP table (MPT) is updated and the content ID/content version are updated in step ST10. Although not shown in the flow, the receiver 200 continuously receives the signaling message. If updated, it returns to step ST4, the same processing described above is repeated.

As described above, in the transmitting and receiving system 10 shown in FIG. 1, the header of the MMT packet including the file data configuring the predetermined contents is extended. To the extension, the information relating to the contents (file transmission parameter) is inserted (see FIG. 10). Accordingly, at the receiving side, based on the information, the MMT packets including the file data configuring the predetermined contents can be acquired easily and accurately.

In the transmitting and receiving system 10 shown in FIG. 1, to the MP table (MPT) included in the PA message, the file content descriptor having the information relating to the predetermined contents is inserted as one of the file content descriptors (see FIG. 8, FIG. 14). Accordingly, at the receiving side, based on the file content descriptor, the content ID and the content version of the predetermined contents included in the transmission stream, and the file information configuring the contents can be perceived easily.

2. ALTERNATIVE EMBODIMENT

The above-described embodiment illustrates that the file content descriptor is inserted as one of the file content descriptors into the MP table (MPT) included in the PA message. Alternatively, the information relating to the predetermined contents included in the file content descriptor may be acquired at the receiving side by other method. For example, the information may be acquired via a communication from a network server relating to the broadcasting delivery system 100.

The present technology may have the following configurations.

(1) A transmitting apparatus, including:

a transmission stream generating unit for generating a transmission stream where a first transmission packet where transmission media is included in a payload and a second transmission packet where information relating to the transmission media is included in the payload are time division multiplexed;

a transmission stream transmitting unit for transmitting the transmission stream to a receiving side through a predetermined transmission path; and an information insertion unit for inserting first information relating to predetermined contents into a header of the first transmission packet, if the transmission media included in the payload of the first transmission packet is file data configuring the predetermined content.

(2) The transmitting apparatus according to (1) above, in which the first information includes content descriptor information of identifying the predetermined content.

(3) The transmitting apparatus according to (1) or (2) above, in which the first information includes a content version showing an update of the file data configuring the predetermined content.

(4) The transmitting apparatus according to any of (1) to (3) above, in which the first information includes information relating to a part number if the whole predetermined contents are divided into a predetermined number of packets and a part identifier for identifying each part.

(5) The transmitting apparatus according to any of (1) to (4) above, in which the information insertion unit inserts second information relating to the predetermined contents into the payload of the second transmission packet.

(6) The transmitting apparatus according to (5) above, in which the second information includes content identifier information for identifying the predetermined contents.

(7) The transmitting apparatus according to (5) or (6) above, in which the second information includes content version information showing an update of file data configuring the predetermined contents.

(8) The transmitting apparatus according to any of (5) to (7) above, in which
the second information includes reference information configuring the predetermined contents.
(9) The transmitting apparatus according to (8) above, in which
the reference information is an URI.
(10) The transmitting apparatus according to any of (5) to (9) above, in which
the second information includes information relating to an expire date of the predetermined contents.
(11) The transmitting apparatus according to any of (5) to (10) above, in which
the second information includes estimated update time information of the predetermined contents.
(12) The transmitting apparatus according to any of (1) to (11) above, in which
the transmission packet is an MMT packet.
(13) A transmission method, including the steps of:
generating a transmission stream where a first transmission packet where transmission media is included in a payload and a second transmission packet where information relating to the transmission media is included in the payload are time division multiplexed;
transmitting the transmission stream to a receiving side through a predetermined transmission path; and
inserting first information relating to predetermined contents into a header of the first transmission packet, if the transmission media included in the payload of the first transmission packet is file data configuring the predetermined content.
(14) A receiving apparatus, including:
a transmission stream receiving unit for receiving a transmission stream from a transmission side through a predetermined transmission path, the transmission stream where a first transmission packet where transmission media is included in a payload and a second transmission packet where information relating to the transmission media is included in the payload are time division multiplexed,
in which first information relating to predetermined contents is inserted into a header of the first transmission packet, if the transmission media included in the payload of the first transmission packet is file data configuring the predetermined content; and
a file data acquisition unit for filtering the first transmission packet including file data configuring the predetermined contents from the transmission stream using the first information, and acquiring the file data configuring the predetermined contents from the first transmission packet filtered.
(15) The receiving apparatus according to (14) above, in which
second information relating to the predetermined contents is inserted into the payload of the second transmission packet, and
the file data acquisition unit filters the first transmission packet including the first information corresponding to the second information.
(16) A transmission method, including the steps of:
receiving a transmission stream from a transmission side through a predetermined transmission path by a receiving unit, the transmission stream where a first transmission packet where transmission media is included in a payload and a second transmission packet where information relating to the transmission media is included in the payload are time division multiplexed,
in which first information relating to predetermined contents is inserted into a header of the first transmission packet, if the transmission media included in the payload of the first transmission packet is file data configuring the predetermined content; and
filtering the first transmission packet including file data configuring the predetermined contents from the transmission stream using the first information, and acquiring the file data configuring the predetermined contents from the first transmission packet filtered.

DESCRIPTION OF REFERENCE NUMERALS

10 transmitting and receiving system
100 broadcasting delivery system
111 clock unit
112 signal transmitting unit
113 video encoder
114 audio encoder
115 caption encoder
116 signaling generator
117 file encoder
118 TLV (GSE) signaling generator
119 IP service multiplexer
120 TLV (GSE) multiplexer
121 modulator/transmitter
200 receiver
201 tuner/demodulator
202 demultiplexer
203 clock unit
204 video decoder
205 audio decoder
206 caption decoder
207 data broadcasting application engine
208 system control unit
209 synthesis unit

The invention claimed is:
1. A transmitting apparatus, comprising:
circuitry configured to
generate a transmission stream including a first transmission packet where media is included in a payload of the first transmission packet and a second transmission packet where first signaling information including information identifying a content including the media is included in a payload of the second transmission packet, the first transmission packet and the second transmission packet being time division multiplexed;
insert the information identifying the content including the media into a header of the first transmission packet, if the media included in the payload of the first transmission packet is file data configuring the content, such that the information identifying the content included in the first signaling information of the payload of the second transmission packet is the same as the information identifying the content inserted into the header of the first transmission packet; and
transmit the transmission stream, wherein
the first signaling information included in the payload of the second transmission packet is included in an MPEG Media Transport (MMT) Package Table (MPT), which includes a content identification field as the information identifying the content.
2. The transmitting apparatus according to claim 1, wherein the information identifying the content includes a content version showing an update of the file data configuring the content.

3. The transmitting apparatus according to claim 1, wherein the information identifying the content includes information relating to a part number if the content is divided into a predetermined number of packets and a part identifier for identifying each part.

4. The transmitting apparatus according to claim 1, wherein the circuitry is configured to insert second information relating to the content into the payload of the second transmission packet.

5. The transmitting apparatus according to claim 4, wherein the second information includes content version information showing an update of the file data configuring the content.

6. The transmitting apparatus according to claim 4, wherein the second information includes reference information configuring the content.

7. The transmitting apparatus according to claim 6, wherein the reference information is an URI.

8. The transmitting apparatus according to claim 4, wherein the second information includes information relating to an expiration date of the content.

9. The transmitting apparatus according to claim 4, wherein the second information includes estimated update time information of the content.

10. The transmitting apparatus according to claim 1, wherein the first and second transmission packets are MMT packets.

11. A transmission method, comprising:
generating a transmission stream including a first transmission packet where media is included in a payload of the first transmission packet and a second transmission packet where first signaling information including information identifying a content including the media is included in a payload of the second transmission packet, the first transmission packet and the second transmission packet being time division multiplexed;
inserting the information identifying the content including the media into a header of the first transmission packet, if the media included in the payload of the first transmission packet is file data configuring the content, such that the information identifying the content included in the first signaling information of the payload of the second transmission packet is the same as the information identifying the content inserted into the header of the first transmission packet; and
transmitting the transmission stream, wherein
the first signaling information included in the payload of the second transmission packet is included in an MPEG Media Transport (MMT) Package Table (MPT), which includes a content identification field as the first signaling information.

12. A receiving apparatus, comprising:
circuitry configured to
receive a transmission stream, the transmission stream including a first transmission packet where media is included in a payload of the first transmission packet and a second transmission packet where first signaling information including information identifying a content including the media is included in a payload of the second transmission packet, the first transmission packet and the second transmission packet being time division multiplexed, wherein the information identifying the content including the media is inserted into a header of the first transmission packet, if the media included in the payload of the first transmission packet is file data configuring the content, such that the information identifying the content included in the first signaling information of the payload of the second transmission packet is the same as the information identifying the content inserted into the header of the first transmission packet; and
filter the first transmission packet including the file data configuring the content from the transmission stream using the first signaling information, and acquire the file
data configuring the content from the filtered first transmission packet, wherein the first signaling information included in the payload of the second transmission packet is included in an MPEG Media Transport (MMT) Package Table (MPT), which includes a content identification field as the first signaling information.

13. The receiving apparatus according to claim 12, wherein second information relating to the content is inserted into the payload of the second transmission packet, and the circuitry filters the first transmission packet including the first signaling information corresponding to the second information.

14. A reception method, comprising:
receiving a transmission stream, the transmission stream including a first transmission packet where media is included in a payload of the first transmission packet and a second transmission packet where first signaling information including information identifying content including the media is included in a payload of the second transmission packet, the first transmission packet and the second transmission packet being time division multiplexed, wherein the information identifying the content including the media is inserted into a header of the first transmission packet, if the media included in the payload of the first transmission packet is file data configuring the content, such that the information identifying the content included in the first signaling information of the payload of the second transmission packet is the same as the information identifying the content inserted into the header of the first transmission packet; and
filtering the first transmission packet including the file data configuring the content from the transmission stream using the first signaling information, and acquiring the file data configuring the content from the filtered first transmission packet, wherein the first signaling information included in the payload of the second transmission packet is included an MPEG Media Transport (MMT) Package Table (MPT), which includes a content identification field as the first signaling information.

* * * * *